United States Patent [19]
Schlesch et al.

[11] Patent Number: 5,881,766
[45] Date of Patent: Mar. 16, 1999

[54] MANIFOLD AND STATION FOR MOUNTING STEAM/CONDENSATE RESPONSIVE DEVICES IN A CONDENSATE RETURN LINE

[75] Inventors: Ronald D. Schlesch; Charles M. Reynolds; Steven O. Smith, all of Three Rivers, Mich.

[73] Assignee: Armstrong International, Inc., Three Rivers, Mich.

[21] Appl. No.: 870,231

[22] Filed: Jun. 6, 1997

[51] Int. Cl.[6] .................................................. F16K 11/20
[52] U.S. Cl. ..................... 137/597; 137/182; 137/599.1
[58] Field of Search .................................. 137/181, 182, 137/597, 599.1

[56] References Cited

U.S. PATENT DOCUMENTS

| | | |
|---|---|---|
| 722,650 | 3/1903 | Brainerd . |
| 985,362 | 2/1911 | McKeown . |
| 3,351,281 | 11/1967 | Keil ................................ 137/599.1 X |
| 4,149,557 | 4/1979 | Keech et al. . |
| 4,508,135 | 4/1985 | Schlesch et al. . |
| 4,903,722 | 2/1990 | Joseph et al. .................... 137/599.1 X |
| 5,065,785 | 11/1991 | Deacon et al. . |
| 5,277,224 | 1/1994 | Hutton et al. ............................ 137/597 |
| 5,445,187 | 8/1995 | Forguhar ............................. 137/182 X |
| 5,558,124 | 9/1996 | Randall ................................... 137/597 |

OTHER PUBLICATIONS

"Piping Kings" *Plenty Steam Traps* brochure, published pre–Jun. 6, 1996 (8 sheets).
"Trouvay & Cauvin", *The Piston Valve*, brochure pp. 8–12, published pre–Jun. 6, 1996 (5 sheets).
"Trouvay & Cauvin" *PPC Compact Drain Manifold*, pp. 8–13 to 8–15, published pre–Jun. 6, 1996 (2 sheets).

*Primary Examiner*—Stephen M. Hepperle
*Attorney, Agent, or Firm*—Flynn, Thiel, Boutell & Tanis, P.C.

[57] ABSTRACT

A station for mounting a steam/condensate responsive device in a condensate return line comprises a housing block having front and back faces, opposite end faces and top and bottom faces. The back face has a mount for removably mounting a steam/condensate responsive device. The end faces has inlet and outlet ports for connection in a condensate return line. The bottom face has a third port. An inlet valve and outlet valve are operatively interposed between and control flow between the mount and corresponding ones of the inlet and outlet ports. The inlet and outlet valves are located on and extending forward from the front face. The inlet and outlet valves are angled acutely upwardly along the front face. A compact manifold assembly mounts a plurality of such stations.

21 Claims, 12 Drawing Sheets

MANIFOLD AND STATION FOR MOUNTING STEAM/CONDENSATE RESPONSIVE DEVICES IN A CONDENSATE RETURN LINE

FIELD OF THE INVENTION

This invention relates to a station and manifold for mounting a steam/condensate responsive device, such as a steam trap, in a condensate return line and more particularly to a manifold for mounting a plurality of such stations for locating steam traps at a central location in a steam system.

BACKGROUND OF THE INVENTION

One form of steam/condensate responsive device for use in a condensate return line is the well known steam trap. An example is shown in U.S. Pat. No. 4,149,557 assigned to the Assignee of the present invention. Such a trap normally responds to the presence of condensate, and indeed is used to remove this condensate.

U.S. Pat. No. 4,508,135, assigned to the Assignee of the present invention, shows a steam trap with a combined inlet and outlet fitting incorporating an adjustable pivot connection, enabling the steam trap to be always mounted in its normal upright operating position in horizontal, vertical, or sloped condensate return lines. See for example the modified embodiment of FIGS. 3–7 in such patent.

The French company Trouvay & Cauvin, located at Fecamp, France, has marketed a drain manifold, incorporating stations for steam traps, under the series designation PPC, including models PPC1 and PPC2. A given station includes a forged housing block whose opposite end walls have steam inlet and condensate outlet ports for connection to a condensate return line and drain manifold respectively, a back face for mounting a steam trap equipped with a fitting portion of the kind generally shown in abovementioned U.S. Pat. No. 4,508,135 at FIG. 7, a bottom face with drain and test ports and a front face carrying elongate inlet and outlet valves whose length axes converge rearwardly (i.e., in the general direction of the steam trap and housing block back wall).

However, the known PPC inlet and outlet ports and inlet and outlet valves substantially define a common midplane which, parallel to and spaced between the block top and bottom faces. Such common midplane is horizontal with the steam trap properly oriented for operation. A drain valve and/or a test valve depend from the bottom face of the housing block for condensate return line bleed or testing of the operation of the trap. These valves are external valves not housed in the station housing body and so require extra space below the housing body, thereby limiting the station stacking density in a multiple arm drain manifold.

While the Trouvay & Cauvin station above described has been generally satisfactory, the present applicant has noted the possibility of providing an even more compact station structure and thereby enabling greater compactness and packing density of the stations in a multi-station drain manifold. Such is particularly desirable in existing steam systems where, for convenience in maintenance or other reasons, one wants to concentrate the location of steam traps at a single, accessible location without substantial relocation of other steam system components to make the required space.

Applicant has further noted the possibility of providing greater protection against damage to, and operating accessibility for, bleed and test valves, by locating them internally in the housing block and has further noted that this can be done without significant, if any, increase in housing block size.

Accordingly, it is an object and purpose of the present invention to provide improvements, including one or more of those above stated, in manifold/station systems of this general kind.

Other objects and purposes of the invention will be apparent to persons familiar with apparatus of this general kind upon reading the following description and inspecting the company drawings.

SUMMARY OF THE INVENTION

In one aspect, this invention relates to the station for mounting a steam/condensate responsive device in the condensate return line wherein elongate valve members acutely angle from the front face of a housing block, with respect to a plane through the front, back and end faces of the block, i.e., angle acutely with respect to a plane parallel to the top and bottom faces of the housing block.

In another aspect of the invention, there is provided a compact multi-station manifold assembly for mounting plural steam/condensate responsive devices in a steam system and wherein valves angle from the front face of the station block, and with respect to a plane parallel to the top and bottom faces of the housing block.

DETAILED DESCRIPTION

Figure 2:
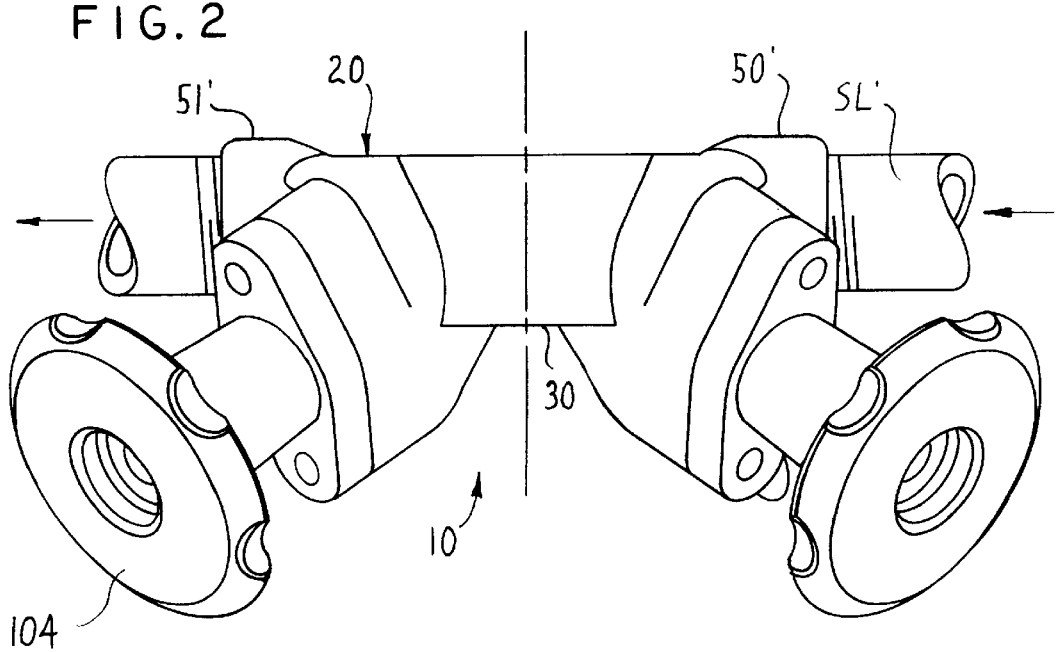
FIG. 2 is a top view of the FIG. 1 station.
Figure 1:
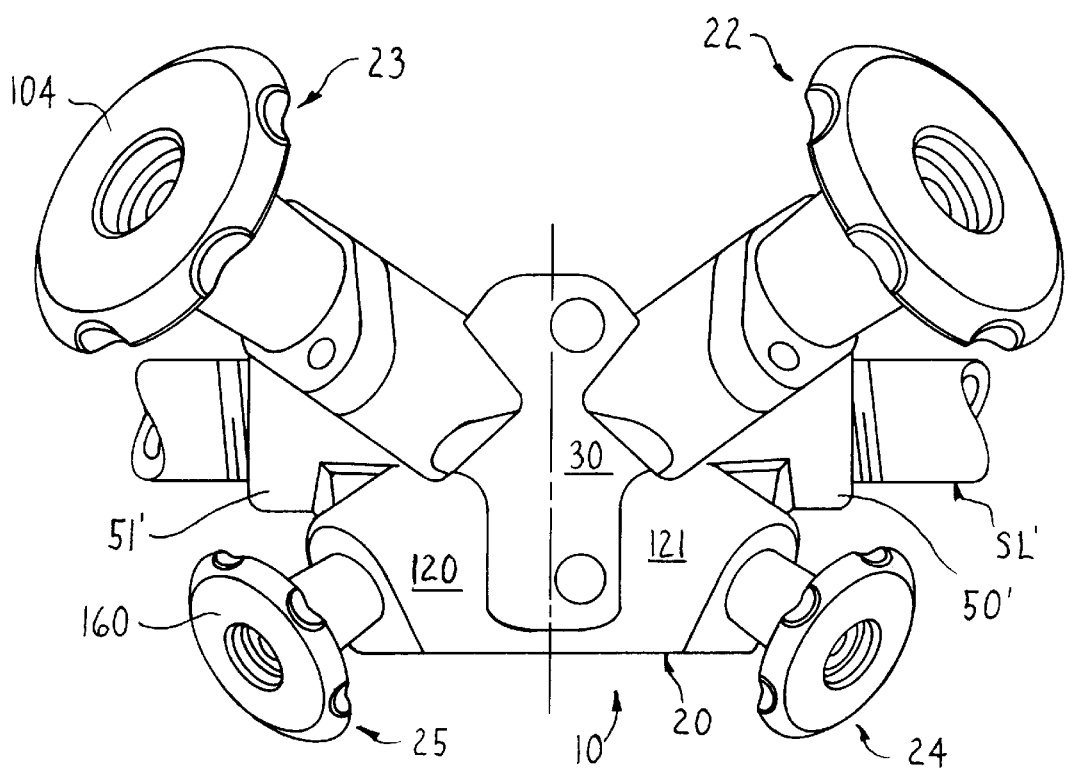
FIG. 1 is a front view of a right to left flow station embodying the invention.
Figure 15:
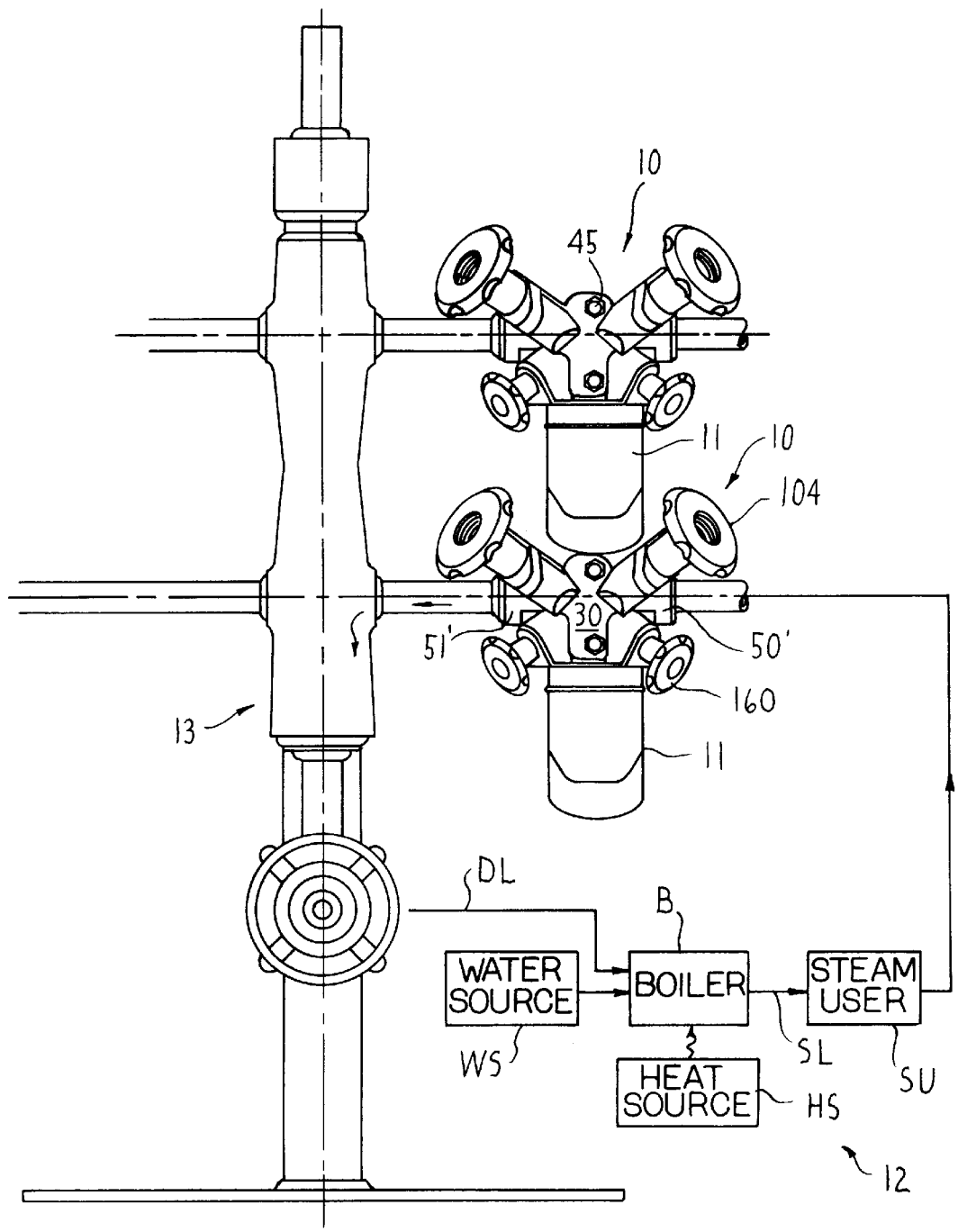
FIG. 15 is a front view of a manifold for mounting stations of the kind shown in FIGS. 1 and 3.

FIGS. 1 and 2 disclose a station 10 for mounting a steam/condensate responsive device, for example a steam trap 11 (FIG. 15) in a steam system schematically indicated at 12 in FIG. 15. Such a steam system may have a variety of conventional configurations but, in the schematic system 12 in FIG. 15, comprises a boiler B, furnished water from a water source WS and heated by heat source HS for producing steam in a condensate return line SL connected to a steam utilization device SU of any designed type (e.g. space heater, engine, etc.) which extracts heat energy from the steam. Resultant heat energy depleted fluid (steam and condensate) is applied through a line SL' to a steam trap 11, which returns condensate through a drain manifold 13 and a drain line DL to the boiler B.

Figure 5:
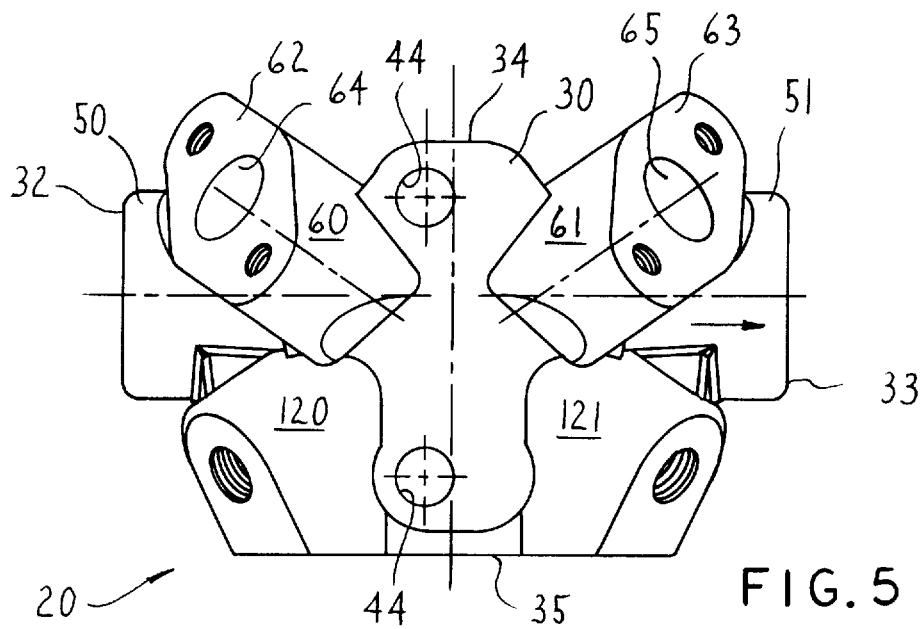
FIG. 5 is a front view of the block of FIG. 3.
Figure 8:
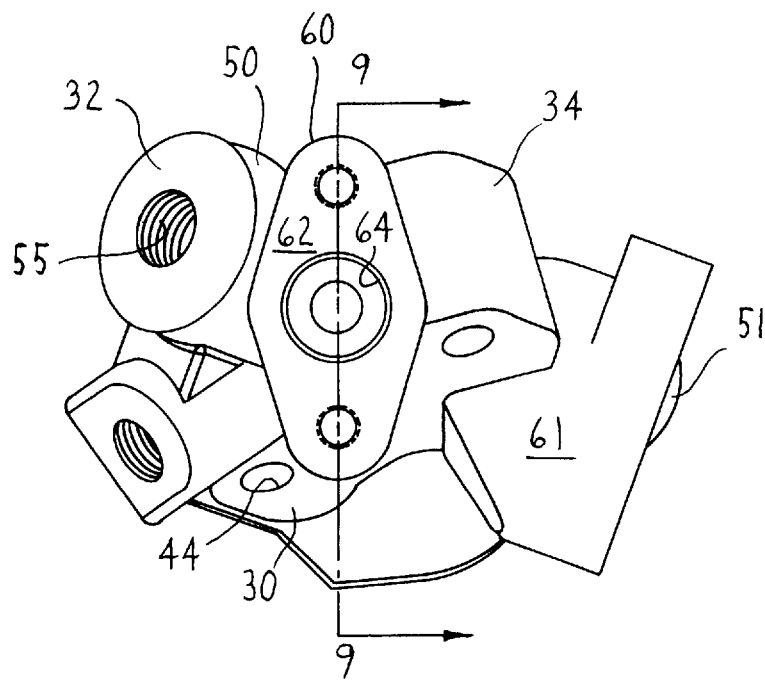
FIG. 8 is a view of the FIG. 5 block taken along the length axis of the inlet valve 4.

Turning in more detail to the station 10 (FIGS. 1 and 2), same comprises a housing block 20 having a front face 30 from which forwardly divergently angle, in a porcupine-like manner, knobs of an inlet valve 22 and outlet valve 23 and, optionally, a bleed valve 24 and/or a test valve 25. The housing block 20 (FIGS. 5–13) comprises the front face 30, a back face 31, left and right (as seen from the front in FIG. 5) end faces 32 and 33, a top face 34 and a bottom face 35. The back face 31 has a mount, generally indicated at 40 (FIG. 7), for removably mounting a steam/condensate responsive device, such as a steam trap 11 (FIG. 15).

Figure 7:
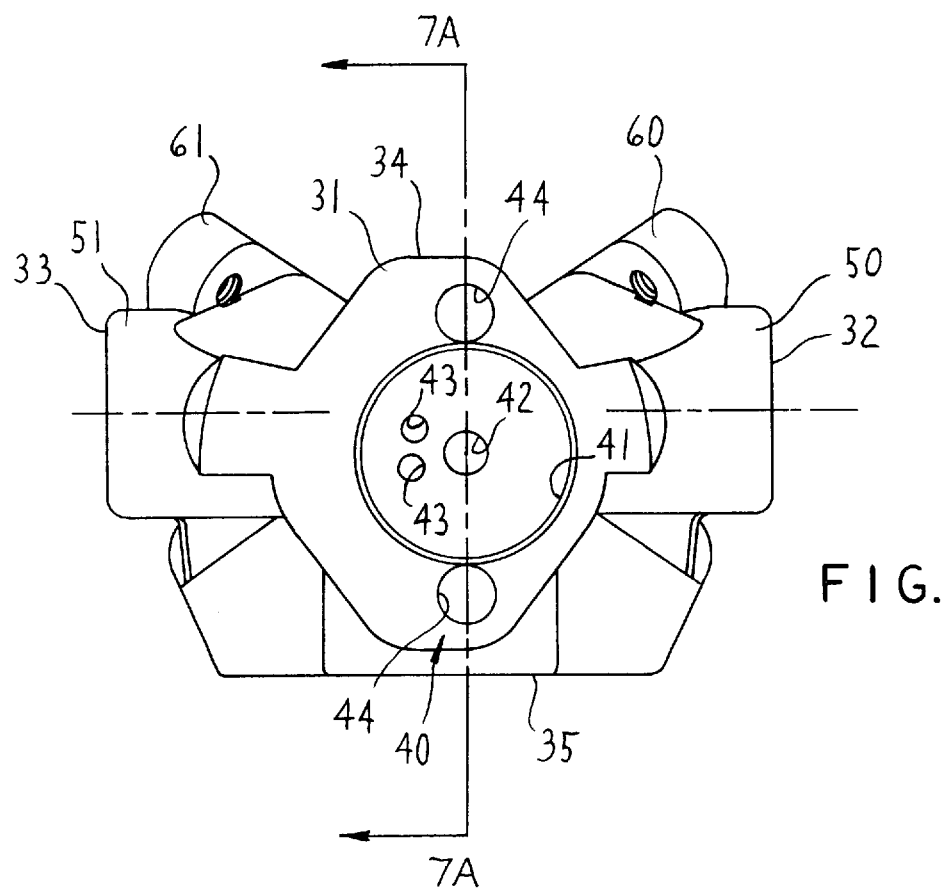
FIG. 7 is a rear view of the FIG. 5 block.
Figure 14:
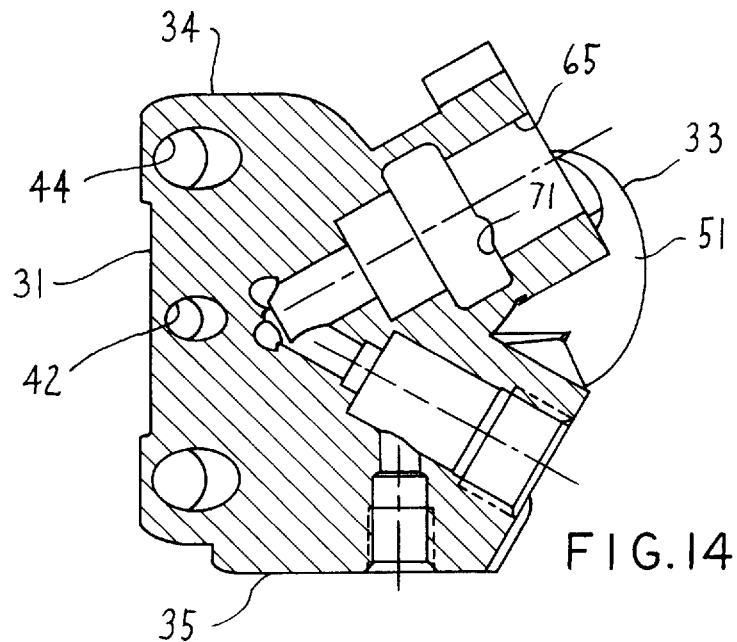
FIG. 14 is a sectional view taken on the line 14—14 of FIG. 10.
Figure 7A:
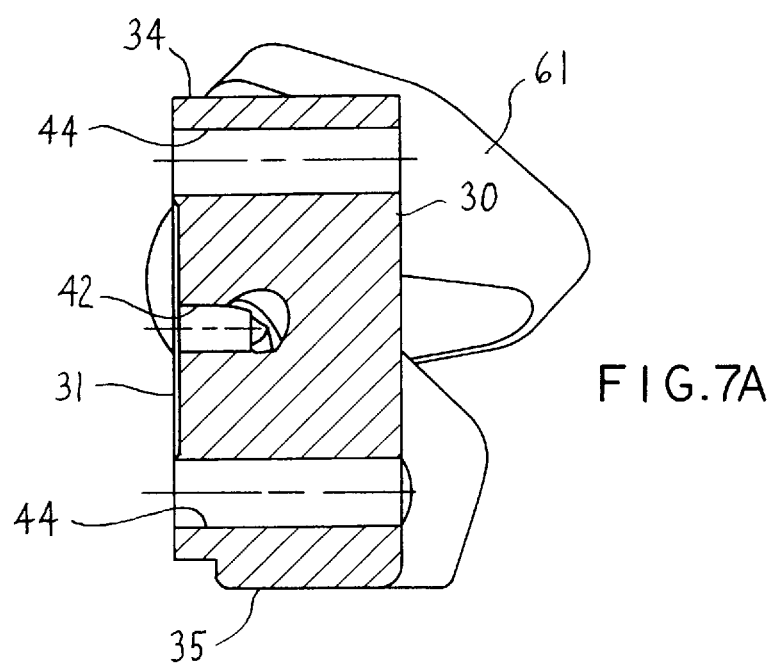
FIG. 7A is a sectional view substantially taken on the line 7A—7A of FIG. 7.
Figure 11:
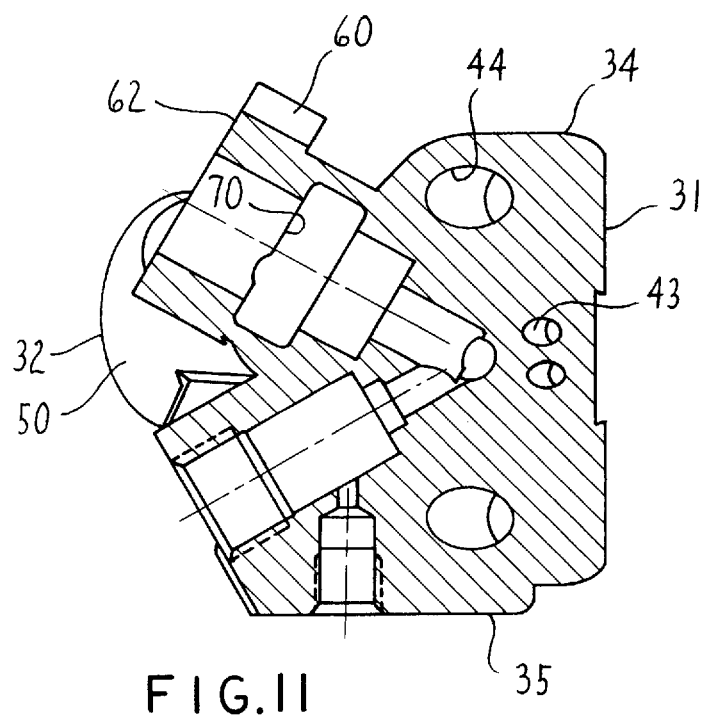
FIG. 11 is a sectional view substantially taken on the line 11—11 of FIG. 10.
Figure 9:
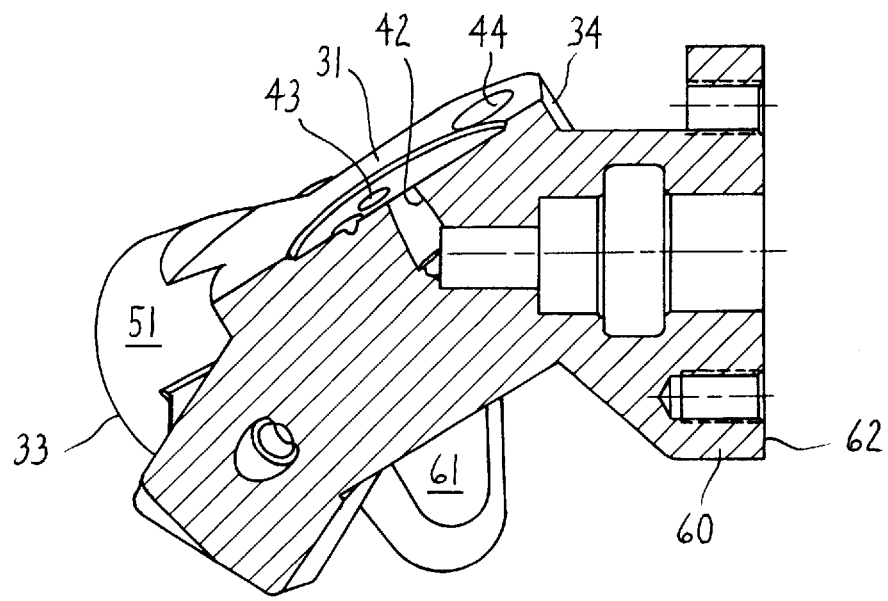
FIG. 9 is a sectional view taken on the line 9—9 of FIG. 8.
Figure 10:
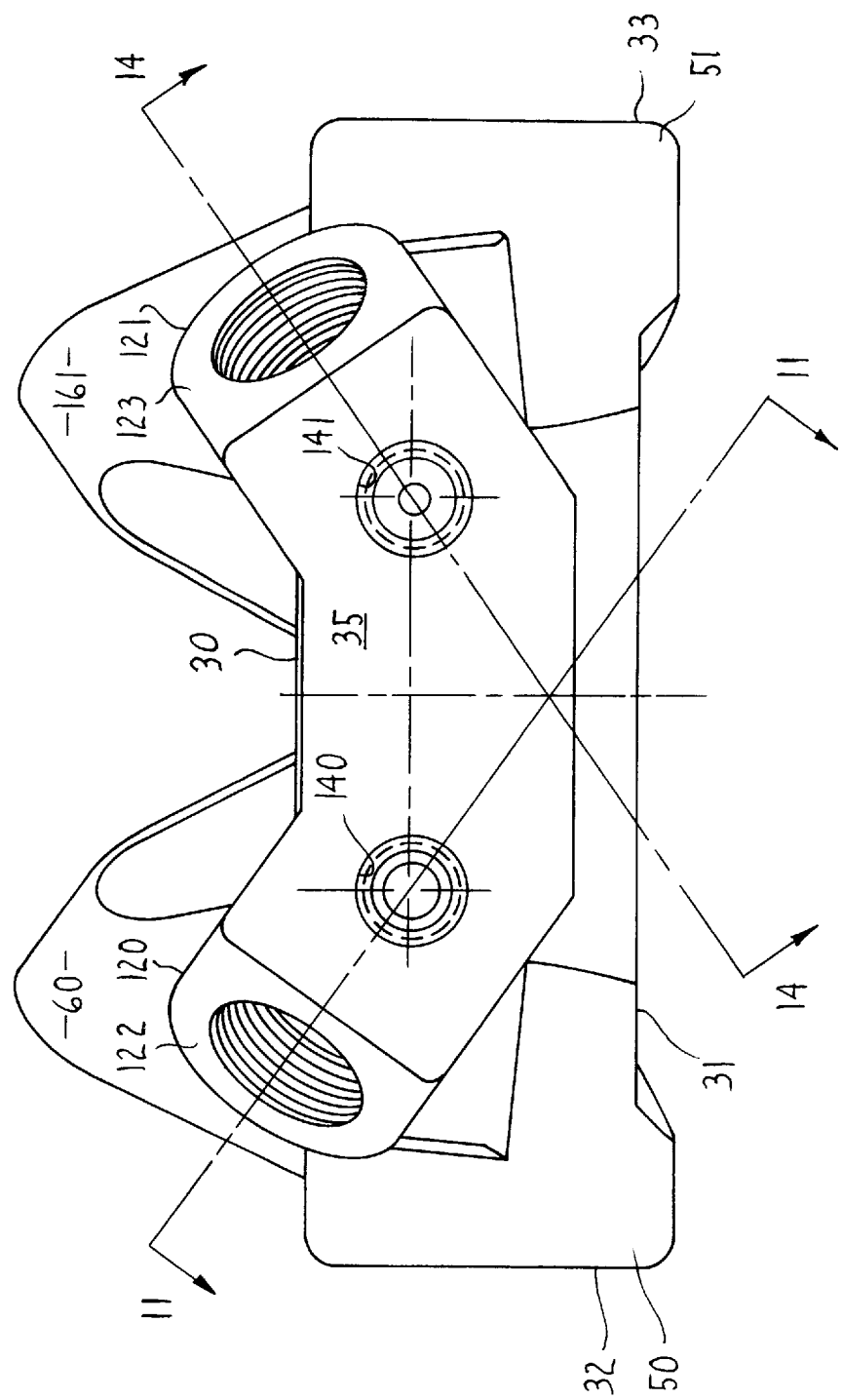
FIG. 10 is a bottom view of the FIG. 5 block.
Figure 13:
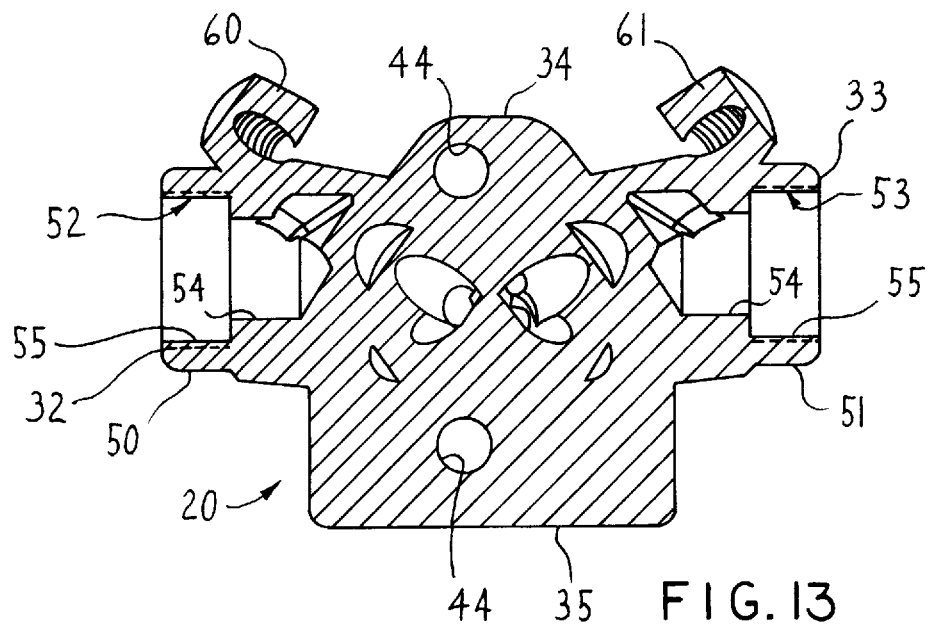
FIG. 13 is a sectional view taken on the line 13—13 of FIG. 12.
Figure 12:
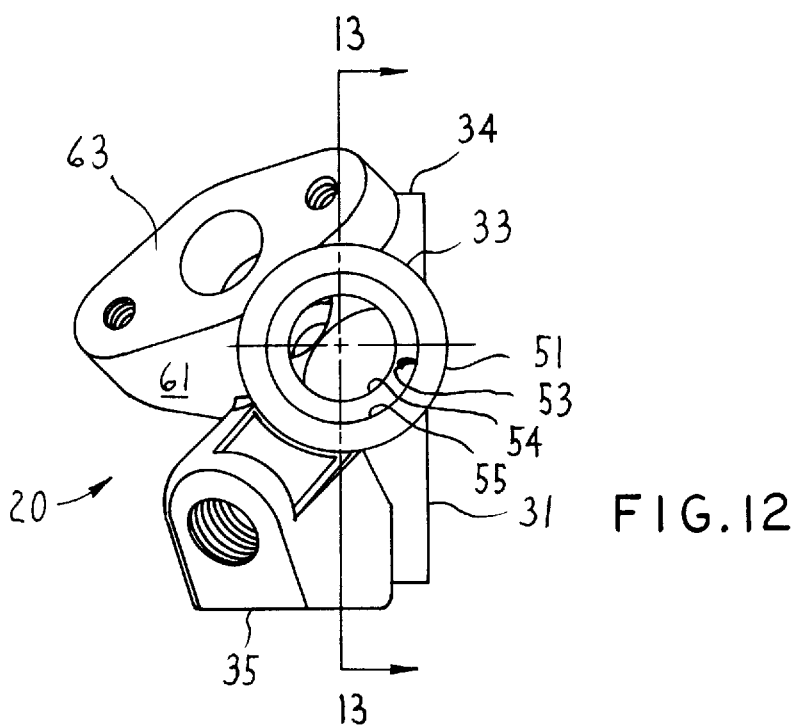
FIG. 12 is an elevational view taken from the right end of the FIG. 5 block.

Mount 40 (FIG. 7) comprises a shallow circular recess 41 in a central portion of the back face 31. In the embodiment shown, the recess 41 is offset slightly laterally off center in FIG. 1. An opening 42 is centered in the recess 41 and opens rearward therefrom. A pair of openings 43 open rearwardly from the recess 41 and are spaced eccentrically between the opening 42 and the perimeter of the recess 41. The openings 43 preferably are circumferentially close as seen in FIG. 7. The openings 43 are at the same radial distance from the center of opening 42.

Mounting holes 44 are located immediately above and below the recess 41 on a vertical diametral plane of the recess 41 and central opening 42. The mounting holes 44 extend through the thickness of the housing block 20 and thus open through the front face 30 (FIG. 5) thereof.

Figure 6:
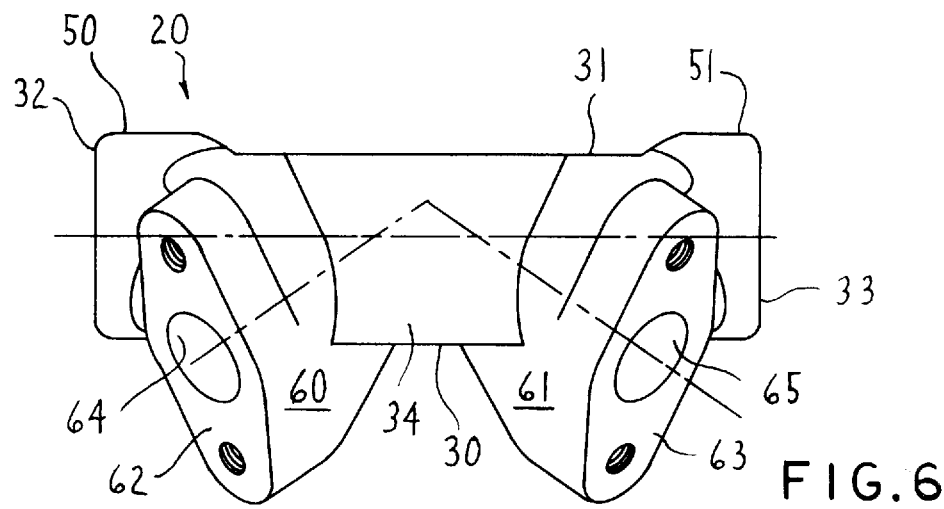
FIG. 6 is a top view of the FIG. 5 block.

While the mount 40 may be configured for use with other steam system devices, in the embodiment shown, it is, to the extent above described, configured similar to the coupling 71A of FIG. 6 of the aforementioned U.S. Pat. No. 4,508,135, assigned to the Assignee of the present invention, for mounting a steam trap providing with a coupling like that at 111 in FIG. 7 of aforementioned U.S. Pat. No. 4,508,135. While such coupling 111 may be used to carry a variety of steam system devices, a particular example would be a steam trap such as that illustrated in aforementioned U.S. Pat. No. 4,508,135 at FIG. 7, or as more fully disclosed in U.S. Pat. No. 4,149,557 also assigned to the Assignee of the invention. Such a steam trap is, by way of example, shown at 11 in FIGS. 15 and 16 of the enclosed drawings and provided with a collar of the aforementioned type, indicated at C in FIG. 16.

Figure 17:
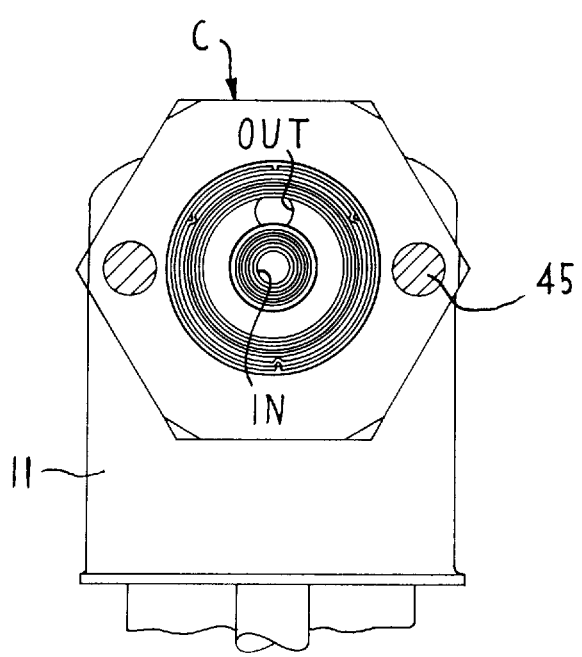
FIG. 17 is a fragmentary front view of a steam trap having a coupling adapted to be fixed on the station of FIG. 1 or 3.

For convenient reference, the front face of such collar C and a fragment of a steam trap 11 carried thereby, are shown herewith in FIG. 17, which FIG. 17 corresponds in structure to aforementioned FIG. 7 of aforementioned U.S. Pat. No. 4,508,135.

Machine screws 45 (FIG. 17) pass rearward through the mounting holes 44 in the housing body 20 and thread into the collar C to fixedly support the steam trap 111 on the rear face of the housing body 20. By loosening the screws 45, the housing body 20 can be rotated, about the axis of center opening 42, while leaving the steam trap 111 upright for proper operation. This allows the housing block 20 to be placed in a piping system in different angular orientations (i.e., rotated clockwise or counterclockwise from its FIG. 1 position beyond 360°) while still leaving the associated steam trap upright.

The block 20 (FIGS. 5, 12 and 13) includes coaxial, substantially cylindrical, leftwardly and rightwardly extending bosses 50 and 51 whose ends carry the end faces 32 and 33. The bosses 50 and 51 (FIG. 13) have respective coaxial ports 52 and 53 coaxially opening therefrom. Preferably, each of the ports 52 and 53 comprises a hole 54 whose outer end is an enlarged diameter, coaxial, outward opening recess 55. The recesses 55, in the preferred embodiment shown, are threaded internally (as indicated by the dotted lines in FIG. 13) for connection to conventional pipes constituting part of the piping associated with a steam system like that generally indicated in FIG. 15.

As will be apparent from the drawings, the embodiment of the block 20 shown in FIGS. 3–14 is, when seen from the front (as in FIG. 3) arranged for flow from left to right, the inlet boss 50 being on the left, and the outlet boss 51 being on the right. However, this is a modification, in left to right (in FIGS. 1 and 3) for purposes of adaptation to a condensate return line of reverse flow direction, of the embodiment shown in FIGS. 1, 2, 15 and 16. For convenience in reference, the right to left flow station (shown in FIGS. 1, 2, 15 and 16) has its inlet boss indicated at 50' and its outlet boss indicated at 51'. Again, it will be understood that the FIG. 1, 2, 15 and 16 embodiment is identical to that of FIGS. 3–14 except for the mirror imaging horizontally (as seen from the front in FIGS. 1 and 3 for example) to accommodate condensate return line flow in opposite directions in the corresponding corresponding condensate return line.

The housing block 20 (FIGS. 5 and 6) further includes inlet and outlet valve bosses 60 and 61 having respective generally diamond shaped, somewhat rounded, end faces 62 and 63. Inlet and outlet valve bores 64 and 65 (FIGS. 5 and 6) extend, preferably in substantially centered and perpendicular relationship, through the end faces 62 and 63, respectively, of the inlet and outlet valve bosses 60 and 61. As seen schematically in FIG. 4, the inlet and outlet valve bores 64 and 65 extend convergently into the housing block 20 sufficient to respectively intersect the center opening 42 and eccentric openings 43. The inlet and outlet valve bores 64 and 65 extend through the radially enlarged inlet and outlet chambers 70 and 71, respectively. The chambers 70 and 71 are formed within the block 20 and extend radially outward into communication with the inlet and outlet ports 52 and 53, respectively, so as to communicate the latter with the center opening 42 and eccentric openings 43, respectively.

Figure 4:
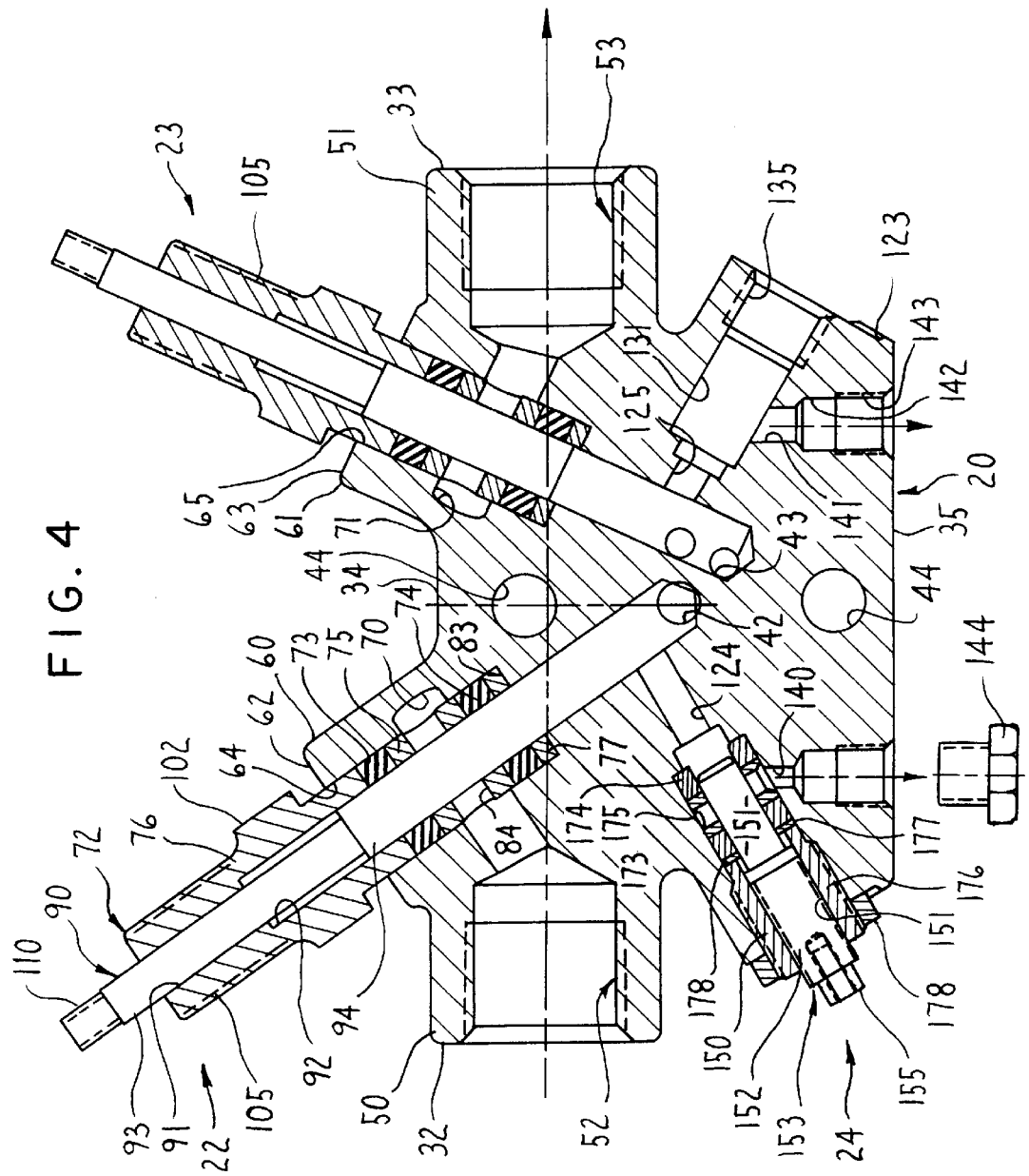
FIG. 4 is a schematic cross sectional view based on the FIG. 3 station, the schematizing including in effect pivoting the forward angled FIG. 3 valve axes rearwardly into a common plane and rearward shifting of the bleed and testports into that common plane, changing angular relationships between ports and valves, and changing other dimensional relationships to provide a clear view of flow paths through the station block.

The inlet and outlet valves 22 and 23 are preferably identical and may be of any convenient type capable of turning on and off and controlling rate of flow. As schematically indicated in FIG. 4, the inlet valve 22 controls flow from the inlet port 52 through the inlet chamber 70 and inlet valve bore 64 to the center opening 42 and thence to the steam trap 11 (FIG. 15). On the other hand, the outlet valve 23 controls flow from the steam trap 11 through the eccentric openings 43 (as schematically indicated in FIG. 4) through the inner part of the outlet valve bore 65, outlet chamber 71 and outlet port 53. The inlet and outlet valves 22 and 23 are conveniently identical, may be conventional, and in the embodiment shown are generally of a type used in the prior art model PPC Compact Drain Manifold manufactured by Trouvay & Cauvin of Fecamp, France. Similar inlet and outlet valves are also disclosed in U.S. application Ser. No. (Attorney reference Armstrong Case 37) assigned to the Assignee of the present invention, to which reference may be made.

Thus, in the embodiment schematically shown in FIG. 4, the valves 22 and 23 each comprise a hollow tubular valve sleeve 72. The sleeve 72 has an inner portion snugly but slidably received in a cylindrical outer recessed portion of the corresponding valve bore 64 or 65 and which includes outer and inner annular seals 73 and 74 coaxially flanking a radially ported flow collar 75 and in turn coaxially flanked by an outer elongate portion (or bonnet) 76 of the valve sleeve 72 and an inner end ring 77. When installed in the block 20, as schematically indicated in FIG. 4, the inner end ring 77 bottoms on an axially outwardly facing step 83 in the corresponding valve bore 64, 65. The annular seals 73 and 74 are located axially outboard and inboard, respectively, of the inlet or outlet chamber 70 or 71 and the flow collar 75 extends axially through the inlet or outlet chamber 70 or 71, such that radial ports 84 therein communicate the interior end of the corresponding inlet or outlet valve bore 64 or 65 with the corresponding inlet or outlet chamber 70 or 71.

The inlet and outlet valves 22 and 23, as schematically indicated in FIG. 4, each further include an elongate valve stem 90 coaxially slidably snugly guided in the corresponding valve sleeve 72 to open and close flow through the radial ports 84. The valve sleeve 72 has a coaxial bore 91 opening axially outwardly away from the block 20 and an elongate, coaxial enlarged diameter, recess 92 extending axially inward therefrom through the elements 73–75 and 77. The valve stem 90 correspondingly comprises an axially outer actuating rod 93 snugly and slidably guided in the outer bore 91 and an enlarged diameter, elongate, generally cylindrical, valve plunger 94 extending coaxially inboard fixedly from the rod 93 and snugly, sealingly, axially slidable through the parts 73–75 and 77 of the valve sleeve 72, as schematically indicated in FIG. 4 in the closed position of the valves 22 and 23. Thus, in this closed position, the valve plunger 94 blocks the ports 84 and seals with respect to the inner annular seal 74 to positively block flow through the corresponding valve 22 or 23. The recess 92 extends axially outward from the valve plunger 94, in the closed position of the latter shown schematically in FIG. 4, to allow axially outward movement of the valve stem 90 sufficient to axially outwardly withdraw the valve plunger 90 to clear the seal 74 and ports 84, and thereby open flow through the. corresponding valve 22 or 23, i.e. open flow from the inlet port 52 to the center opening 42 or from the eccentric openings 43 to the outlet port 53.

To fix the valve sleeve 72 to the block 20, screws 100 extend through holes 101 in rounded, substantially diamond-shaped, radial flanges 102 on the portion of the valve sleeve 72 outside and adjacent the block 20. The screws 100 threadedly engage threaded openings 103 flanking the valve inlet or outlet bore 64 or 65 in the opposed end face 62 or 63 of the corresponding inlet or outlet valve boss 60 or 61.

Figure 3:
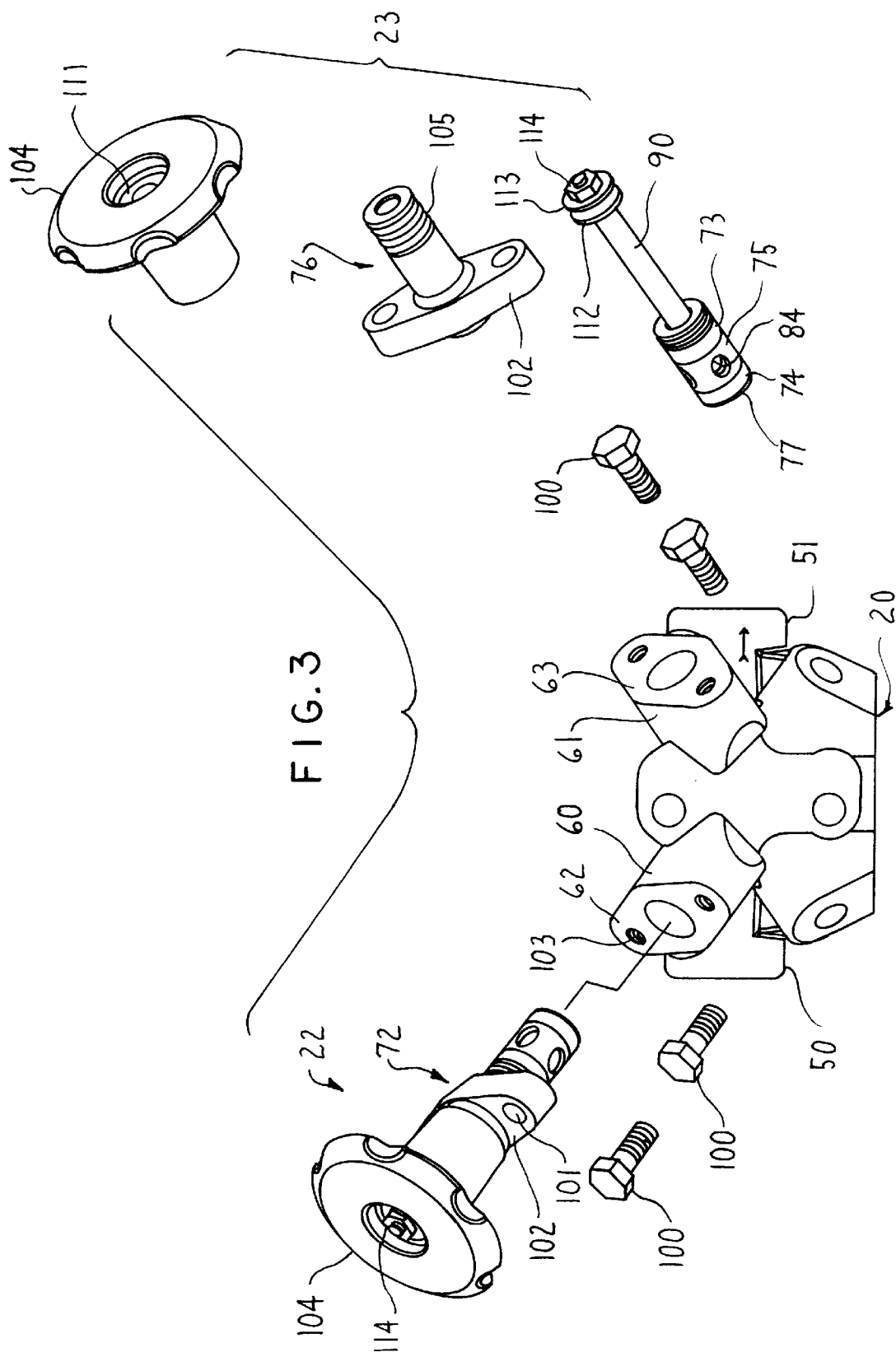
FIG. 3 is an exploded view, taken from the front, of a station like that of FIG. 1 but mirror imaged for left to right flow.

The inlet and outlet valves 22 and 23 here shown each further include a manually rotatable knob 104 (FIG. 3). The knob 104 is hollow and has internal threads (not shown) threaded on external threads 105 (FIG. 4) on the bonnet 76 for threaded axial in and out movement of the knob on the exposed outer end of the valve sleeve 72, toward and away from the block 20. The outer end portion 110 of the valve stem 90 is radially inwardly stepped and threaded to receive thereon a radially inwardly directed flange 111 (FIG. 3) of the knob 104. A nut 114 (FIG. 3) threads on the threaded outer end portion 110 of the valve stem 90 to tightly grip the knob flange 111 between washers 112 and 113 and thereby fix the knob 104 on the valve stem 90. In this way, rotation of the knob 104 threads it axially along the valve sleeve 72 and axially advances or retracts the valve stem 90 to open or close the corresponding inlet or outlet valve 22 or 23.

The block 20 further includes bleed and test valve bosses 120, 121. The bosses 120 and 121 have end faces 122 and 123 each substantially perpendicular to the length axis of the corresponding boss. As schematically shown in FIG. 4, a bleed valve bore 124 opens centrally of the end face 122 and extends substantially coaxially into the boss 120 and thence into the central portion of the body 20 to intersect the inlet valve bore 64 at a location between the central hole 42 serving the steam trap inlet and the interior end of the inlet valve 22. Similarly, a test valve bore 125 opens centrally of the end face 123 of the boss 121 and extends substantially coaxially into the boss 121 and thence into the central portion of the body 20 to intersect the outlet valve bore 65 at a location between the outlet valve 23 and the eccentric holes 43 serving the steam trap outlet.

The valve bores 124 and 125 preferably are similar to each other and are here similar to the valve bores 64 and 65 above described. A description of bore 125 thus will also serve for bore 124. Thus the bore 125 here includes an outward facing, coaxial relief 130 at the inner end of an increased diameter central recess 131. At the outboard end of the central recess 132, the diameter of the bore 125 increases again to form an increased diameter internally threaded, outer recess 133 whose outermost portion is also threaded, namely at 135. The valve bores 124 and 125 are provided for occupancy by the aforementioned bleed and test valves 24 and 25 (FIGS. 1 and 2).

The block 120, as schematically indicated in FIG. 4, also includes bleed and test ports 140 and 141, respectively, which open downward through the bottom 35 of the block 120 and extend upward therefrom into communication with the corresponding bleed and test valve bores 124 and 125, each at the central recess 131. In the embodiment shown, the ports 140 and 141 each include an outwardly (downwardly) facing enlarged diameter recess 142.

The bleed and test valves 24 and 25 are preferably similar to each other. A description of the bleed valve 24 thus will also suffice for the test valve 25. The particular valve 24 shown in schematic FIG. 4 comprises a tubular guide sleeve 150 externally threaded for threaded fixed reception in the threaded outer recess 133. A portion of the guide sleeve 150 extends outward beyond the end face 122 of the boss 120 and a lock nut threads externally on and locks the guide sleeve in the block 20 and bears on the end face 122.

Much like the valves 22 and 23, the valves 24 and 25 each include, coaxially inboard of the valve sleeve 150, axially outer and inner annular seals 173 and 174 flanking a radially ported flow collar 175 and separated from the outer elongated portion 176 of the valve sleeve 150 by an end ring 177. A lode nut 178 locks the guide sleeve 150 against movement on the block 20.

The valve 24 further includes an elongate valve stem 153 having an outer portion 152 threaded in the central passage 151 of the guide sleeve 150 and a coaxial reduced diameter, cylindrical, inner portion, or valve head 154 longitudinally slidably and sealingly engaging the annular seals 173 and 174 for positively blocking flow from the corresponding inlet valve bore 64 or outlet valve bore 65, through the bleed port 140 or test port 141.

The outer end portion 155 of the valve stem 153 is reduced in diameter and externally threaded for reception in the central opening of a knob 160 (FIGS. 1 and 2). The knob 160 may be similar to (but preferably smaller in diameter than) the above described knobs 104. In the embodiment shown, washers 162 and 163 and a nut 164 fix the knob 160 on the outer end portion 155 of the valve stem 153, like the washers 112 and 113 and nut 114 (FIG. 3) do as to the knob 104 on valve stem 90.

Rotation of the knob 160 in the appropriate direction threadedly advances the knob threads of the guide sleeve 150 and valve stem 153 with respect to the block 120 to seat the valve head 154 in annular seal 174 to close the valve or to back the head 154 out away from the seal 174 and open the valve.

The block 20, in either its FIG. 3 form or FIG. 1 mirror imaged form, is readily manufacturable by casting, preferably investment casting, wherein a mold insert forms the central portion of the inlet port 52 and inlet valve bore 64 and the communicating inlet chamber 70 and a comparable mold insert forms central portions of the outlet port 53 and outlet valve bore 65 and the outlet chamber 71. Thereafter, the inlet and outlet ports 52 and 53 can be finished by machining, particularly drilling and tapping. The valve bores 64 and 65 can be finished and longitudinally extended by drilling. The bleed and test valve bores 124 and 125 can be drilled and tapped and the holes 42, 43 and 44 can be drilled.

The present invention contemplates that in some instances the apparatus may be provided without one or both of the bleed and test valves 24 and 25. Thus, if desired, lower priced versions of the apparatus may be provided with the bores 124, 125, 140, and 141 entirely omitted, for example, where bleed and test capabilities will not be required.

Referring to FIG. 1, the valves 22–25 and their corresponding bosses are angled 3-dimensionally, namely both radially outward of the central portion of the block 20 and forwardly from the front face 30 of the block, in what might be described as a porcupine-like manner. The length axes of the four valves 22–25 thus angle divergently forwardly from the front face 30 of the block 20. As seen from the top or bottom (FIG. 6 or 10) the longitudinal axes of the four bosses 60, 61, 120 and 121, and their corresponding valves 22–25 angle forwardly from the plane of the back face 31 of the block by approximately 30° to 35°. As seen from the front, as in FIG. 5, the bosses 60 and 61 and the longitudinal axes of their valve bores 64 and 65 angle up from the horizontal (as defined by the block bottom 35 or the common central axis of the inlet and outlet bosses 50 and 51, again by about 30° to 35°. Correspondingly, the longitudinal axes of the bleed and test bosses 120 and 121 angle downward from the horizontal by, again, about 30° to 35°. Clearly, these bosses and their corresponding valves are acutely angled either downwardly or upwardly with respect to an imaginary plane extending through the front back and end faces of the block 20 and parallel to the common center line of the inlet and outlet bosses 50 and 51, which imaginary plane is substantially parallel to the top and bottom faces 34 and 35 of the block. As indicated in part by FIG. 6 or FIG. 14, the length axes of the valves and their ports converge toward a zone behind the front face 30 of the block 20. It will thus be seen that FIG. 4 is schematic in the sense of, for purposes of convenient disclosure, showing the axes of the four valves, as well as the four ports, all in the same plane, namely the plane of the page in FIG. 4. FIG. 4 is thus presented as a convenient schematic way to disclose, in one drawing figure, the flow connections between all the ports and valve bores. However, FIG. 4 does not show, and is not intended to show, the 3-dimensional space occupied by the 3-dimensionally diverging set of four valve bores of the actual device embodying the invention.

Figure 16:
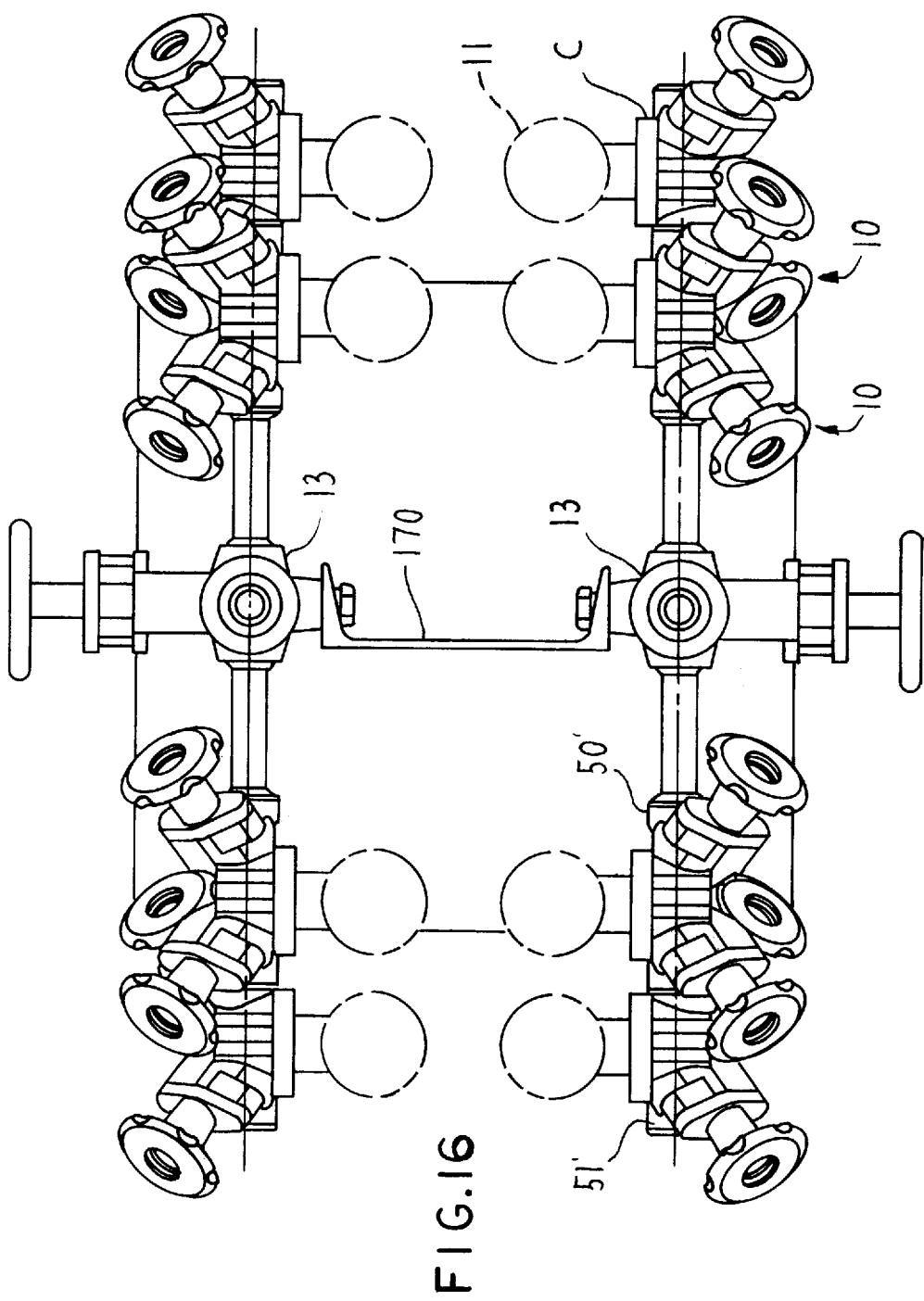
FIG. 16 is a top view of back to back pair of the FIG. 15 manifolds.

This 3-dimensionally forwardly diverging, porcupine-like arrangement of the four valves is particularly advantageous in drain manifold systems (or trees) exemplified at 13 in FIGS. 15 and 16 since it locates the corresponding valve knobs 104 and 160 forwardly spaced from the front face 30 of the corresponding block 20 and thus forwardly of the inlet/outlet piping associated with the manifold 13 and well forwardly of the attached steam trap 11. Thus, the knobs 104 and 160 are in effect located in a cool zone spaced forward of the potentially hot surfaces of the condensate return line and steam trap for less risk of injury to workers manipulating the knobs.

In addition, the divergent forward angling of the valve axes locates all four knobs in a substantially smaller area than would be the case in a monoplanar, pancake-like arrangement of the kind shown in schematic FIG. 3, permitting a higher density of trap stations 10 in a given spacial volume.

In addition, the above described station 10 allows even further reductions in space required by permitting lateral offsetting of stations located on adjacent vertically spaced horizontal pipes of a given manifold system 13 as indicated in FIG. 16.

Even greater packing density of steam traps for units face is achievable by the close location back to back of two planar manifold arrays, here carried on the same upright channel member 170 in FIG. 16.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A station for mounting a steam/condensate responsive device in a condensate return line, comprising:

a housing block having front and back faces, opposite end faces and top and bottom faces, said back face having a mount for removably mounting a steam/condensate responsive device, said end faces having inlet and outlet ports for connection in a condensate return line, said bottom face having a third port, an inlet valve and outlet valve operatively interposed between and controlling flow between said mount and corresponding ones of said inlet and outlet ports, and a third valve operatively interposed between and controlling flow between said third port and one of said inlet and outlet ports said valves being all located on said front face and angled divergently forwardly therefrom and with respect to each other.

2. The apparatus of claim 1 in which at least one said valves is acutely angled downward and another of said valves is acutely angled upward with respect to an imaginary plane extending through said front, back and end faces of said block.

3. The apparatus of claim 2 in which said imaginary plane is substantially parallel to said top and bottom faces of said block.

4. The apparatus of claim 2 in which said imaginary plane is substantially parallel to the length axes of said inlet and outlet ports.

5. The apparatus of claim 1 including a fourth valve located on said front face and angled divergently forwardly therefrom and with respect to said inlet outlet and third valves, wherein said valves angle divergently forward from said block in a generally porcupine-like manner.

6. The apparatus of claim 5 in which said valves have length axes converging toward a zone behind said front face of said block.

7. The apparatus of claim 1 including inlet and outlet holes in said back face of said block at said mount for connection with a steam/condensate responsive device on said mount, an inlet valve bore from said front face of said block and intersecting said inlet hole, an inlet passage from said inlet port intersecting an intermediate part of said inlet valve bore, an outlet valve bore extending from said front face of said block and intersecting said outlet hole, an outlet passage extending from said outlet port and intersecting an intermediate part of said outlet valve bore.

8. The apparatus of claim 7 including a third valve bore extending from the front face of said block and intersecting said inlet valve bore between said inlet passage and inlet hole, a third port extending from the bottom face of said block and intersecting an intermediate part of said third valve bore.

9. The apparatus of claim 8 including a fourth valve bore extending from the front face of the block and intersecting said outlet valve bore between said outlet passage and outlet hole, a fourth port extending from the bottom face of said block and intersecting an intermediate part of said fourth valve bore.

10. The apparatus of claim 9 in which said third and fourth ports have central axes defining a plane parallel to the length axes of said inlet and outlet ports and substantially parallel to said front and back faces of said block and lying therebetween, said holes being substantially perpendicular to said plane, said inlet and outlet and third and fourth valve bores all substantially converging from said front face of said block through said plane towards the block back face.

11. The apparatus of claim 1 in which said steam/condensate responsive device is a steam trap.

12. A compact multi-station manifold assembly for mounting plural steam/condensate responsive devices in a steam system, comprising:
a manifold including a tubular header connectable in a steam system for steam/condensate flow therein, said manifold further including plural lateral tubular arms extending from said header in spaced relation;
stations for mounting respective steam/condensate responsive devices on respective ones of said tubular arms, a given said station comprising a block having an outlet port connectable to said tubular arm and an inlet port connectable to a condensate return line of a steam system, said station having valves angled acutely to an imaginary plane defined by the forward/rearward and side ward axes of said block.

13. The apparatus of claim 12 in which said header is upstanding, said arms on one side of said header being of different length for laterally staggering stations, and thus valves and steam/condensate devices thereof, located above one another to minimize the space required by said manifold assembly.

14. The apparatus of claim 12 including a second similar manifold mounted and spaced back to back relation with said first mentioned manifold, the back faces of said stations on said first and second manifolds facing each other in spaced relation and carrying respective steam/condensate responsive devices in the space between said manifolds.

15. The apparatus of claim 12 in which said header is upstanding, said arms on said one side of said header being of the same length for locating stations thereon and vertically aligned relation, with valves on a vertically spaced pair of said stations framing an opening through which a steam/condensate responsive device can be grasped by service personnel.

16. The apparatus of claim 12 in which said top and bottom faces of said blocks are free of valves to allow close vertical spacing of said stations.

17. The apparatus of claim 12, in which said arms are substantially horizontal and substantially in a common vertical plane and said valves are angled in three dimensionally radiating fashion from the front face of said block and forward from said common plane, said block having bosses on said front face for such valves, such bosses facing and three dimensionally, forwardly radiating directions away from said common plane.

18. A station for mounting a steam/condensate responsive device in a condensate return line, comprising:
a housing block having front and back faces, opposite end faces and top and bottom faces, said back face having a mount for removably mounting a steam/condensate responsive device, said end faces having inlet and outlet ports for connection in a condensate return line, an inlet valve and an outlet valve operatively interposed between and controlling flow between said mount and corresponding ones of said inlet and outlet ports, said inlet and outlet valves being located on said front face and angling divergently forwardly therefrom with respect to each other, said inlet and outlet valves being acutely angled to an imaginary plane parallel to the top and bottom faces of said block.

19. The apparatus of claim 18 in which said bottom face has a third and fourth ports, third and fourth valves operatively interposed between and controlling flow between said third and fourth ports respectively and said inlet and outlet ports respectively said third and fourth valves being located on said front face, all four valves being mutually angled divergently forwardly from said front face in a 3-dimensional, generally porcupine-like manner.

20. A station for mounting a steam/condensate responsive device in a condensate return line, comprising:
a housing block having front and back faces, opposite end faces and top and bottom faces, said back face having a mount for removably mounting a steam/condensate responsive device, said end faces having inlet and outlet ports for connection in a condensate return line, said bottom face having a third port, an inlet valve and outlet valve operatively interposed between and controlling flow between said mount and corresponding ones of said inlet and outlet ports, said inlet and outlet valves being located on and extending forward from said front face, said inlet and outlet valves being angled acutely upwardly along said front face.

21. The apparatus of claim 20 in which said bottom face has a third and fourth ports, third and fourth valves operatively interposes between and controlling flow between said third and fourth ports respectively and said inlet and outlet ports respectively said third and fourth valves being located on said front face, all four valves being mutually angled divergently forwardly from said front face in a 3-dimensional, generally porcupine-like manner.

* * * * *